United States Patent [19]

Andrews

[11] 4,130,511
[45] Dec. 19, 1978

[54] CURABLE EPOXIDE RESIN COMPOSITIONS

[75] Inventor: Christopher M. Andrews, Cambridge, England

[73] Assignee: Ciba-Geigy Corporation, Ardsley, N.Y.

[21] Appl. No.: 794,278

[22] Filed: May 5, 1977

[30] Foreign Application Priority Data

May 19, 1976 [GB] United Kingdom ............... 20630/76

[51] Int. Cl.$^2$ ............................................. C08G 59/68
[52] U.S. Cl. ...................................... 528/92; 252/182; 252/428; 528/106; 528/336; 528/341; 528/407; 528/418
[58] Field of Search ............ 260/47 EC, 2 EC, 78.41; 252/428, 182

[56] References Cited

U.S. PATENT DOCUMENTS

| | | | |
|---|---|---|---|
| 2,886,472 | 5/1959 | Condo et al. | 117/139.4 |
| 3,018,262 | 1/1962 | Shroeder | 260/29.2 |
| 3,328,318 | 6/1967 | Proops et al. | 260/2 |
| 3,492,269 | 1/1970 | Janssen et al. | 260/47 |
| 4,026,858 | 5/1977 | Andrews et al. | 260/30.2 |

FOREIGN PATENT DOCUMENTS

| | | |
|---|---|---|
| 1002154 | 8/1965 | United Kingdom. |
| 1105772 | 3/1968 | United Kingdom. |
| 1277528 | 6/1972 | United Kingdom. |
| 1323728 | 7/1973 | United Kingdom. |
| 1347449 | 2/1974 | United Kingdom. |
| 1428625 | 3/1976 | United Kingdom. |

OTHER PUBLICATIONS

Abstract of Japan, 71-22760, 6-1971, Nomura.

Primary Examiner—Harold D. Anderson
Assistant Examiner—E. A. Nielsen
Attorney, Agent, or Firm—Joseph F. DiPrima; Vincent J. Cavalieri

[57] ABSTRACT

To accelerate the curing of epoxide resins by means of aromatic polyamines there is added magnesium nitrate or a nitrate of an at least divalent metal of Group IIB, IIIB, IVB, VIB, VIIB, or VIII of the Periodic Table.

10 Claims, No Drawings

CURABLE EPOXIDE RESIN COMPOSITIONS

BACKGROUND OF THE INVENTION

It is known that epoxide resins, i.e., substances containing on average more than one 1,2-epoxide group per molecule, may be cured by reaction with various classes of substances to form cross-linked, infusible, insoluble products having valuable technical properties. Typical curing agents include aromatic polyamines.

Although these are useful curing agents, being employed chiefly to cure epoxide resins at room temperature or moderately elevated temperatures, they suffer from the drawback that they often cure the resin only slowly. The use of accelerators alleviates this drawback to some extent but the accelerating effect which these accelerators impart is relatively modest. We have now found that certain nitrates are potent accelerators for curing epoxide resins by aromatic polyamines.

U.S. Pat. No. 2,886,472 discloses that certain metal salts such as zinc fluoborate, magnesium perchlorate, potassium persulphate, zinc sulphate, magnesium fluoborate, copper fluoborate, copper persulphate, chromic nitrate, magnesium nitrate, and calcium phosphite act as curing agents for epoxide resins employed on textile materials, at high temperatures, typically 100° to 200° C. British Patent Specification No. 1,105,772 disclosed that curing of epoxide resins by aliphatic, cycloaliphatic, aromatic, or heterocyclic amines may be accelerated by alkaline earth metal nitrates, lead nitrate, or aluminium nitrate. In British Patent Specification No. 1,428,625 is disclosed a method of hardening epoxide resins with an amine hardener using, as accelerator, an amine-soluble salt of an alkali metal or ammonium, selected from their halides, nitrates, nitrites, thiocyanates, cyanates, and chlorates.

The accelerating effect we have discovered could not be predicted from an examination of the above mentioned patents, since other salts, such as alkali metal and ammonium nitrates and magnesium and other fluoborates, have only little accelerating effect.

DETAILED DISCLOSURE

One aspect of this invention therefore comprises curing compositions, suitable for use as curing agents for expoxide resins, consisting of
  (a) an aromatic compound having more than one amino group directly attached to an aromatic ring and
  (b) a nitrate of magnesium or a di- or higher-valent metal of Group IIB, IIIB, IVB, VB, VIB, VIIB, or VIII of the Periodic Table.

Another aspect of this invention comprises curable compositions consisting of
  (a) an aromatic compound having more than one amino group directly attached to an aromatic ring,
  (b) a nitrate of magnesium or a di- or higher-valent metal of Group IIB, IIIB, IVB, VB, VIB, VIIB, or VIII of the Periodic Table, and
  (c) an epoxide resin.

A further aspect of this invention comprises a process for curing an epoxide resin which consists of forming a mixture of the epoxide resin, a curing amount of an aromatic compound having more than one amino group directly attached to an aromatic ring, and a nitrate of magnesium or a di- or higher-valent metal of Group IIB, IIIB, IVB, VB, VIB, or VIII of the Periodic Table, and allowing or causing the mixture to cure.

The groups of the Periodic Table referred to herein are as shown on pp. 60–61 in Handbook of Chemistry, Lange, Revised Tenth Edition, published by McGraw-Hill. Preferred are the nitrates of cadmium, iron III, and nickel and, in particular, lanthanum, magnesium, manganese, and zinc.

Epoxide resins which may be employed in these compositions are preferably those containing groups of formula

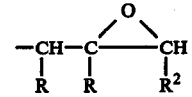

$$-\underset{R}{CH}-\underset{R}{\overset{O}{\overset{\diagup\diagdown}{C}}}-\underset{R^2}{CH}- \qquad I$$

directly attached to atoms of oxygen, nitrogen, or sulphur, where either R and $R^2$ each represent a hydrogen atom, in which case $R^1$ denotes a hydrogen atom or a methyl group, or R and $R^2$ together represent $-CH_2CH_2-$, in which case $R^1$ denotes a hydrogen atom.

As examples of such resins may be mentioned polyglycidyl and poly($\beta$-methylglycidyl) esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)-propane, and 1,1-bis(hydroxymethyl)cyclohex-3-ene; and from alcohols having aromatic nuclei, such as N,N-bis-(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)-ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butyl.phenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)-methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula I where R and $R^2$ conjointly denote a —$CH_2CH_2$— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O- triglycidyl derivative of 4-aminophenol, the glycidyl ether-glycidyl ester of salicyclic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Epoxide resins in which some or all of the epoxide groups are not terminal may also be employed, such as vinylcyclohexene dioxide, limonene dioxide, dicyclopentadiene dioxide, 4-oxatetracyclo $[6,2.1.0^{2,7}.0^{3,5}]$undec-9-yl glycidyl ether, the bis(4-oxatetracyclo $[6.2.1.0^{2,7}.0^{3,5}]$undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro [5,5] undecane, and epoxidised butadienes or copolymers of butadiene with ethylenic compounds such as styrene and vinyl acetate.

If desired, a mixture of epoxide resins may be used.

Preferred epoxide resins are polyglycidyl ethers, polyglycidyl esters, and N,N'-diglycidylhydantoins. Specific preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of moe than 0.5 equivalent per kilogram.

As examples of curing agents may be mentioned those conventionally employed as curing agents for epoxide resins, such as o-, m-,and p-phenylenediamine, bis(4-aminophenyl)methane, aniline-formaldehyde resins, bis(4-aminophenyl)ether, bis(4-aminophenyl) ketone, bis(4-aminophenyl) sulphide, and bis(3-aminophenyl) and bis (4-aminophenyl) sulphone.

An effective, i.e., a curing, amount of the polyamine is employed. The proportion will depend on the chemical nature of the polyamine and the properties sought of the curable composition and its cured product; the optimum proportion can readily be determined by methods familiar to those skilled in the art. By way of illustration, however, there will normally be used from about 0.75 to 1.25 amino-hydrogen equivalents of the polyamine per 1,2-epoxy equivalent of the epoxide resin.

The amount of the accelerator, too, may vary according to such factors as those just mentioned, but usually from 0.2 to 2 parts by weight (calculated as the anhydrous salt) are employed per 100 parts of the combined weights of the epoxide resin and the polyamine.

The accelerator is best incorporated dissolved in an inert organic solvent such as 2-methoxyethanol, ethylene glycol, diethylene glycol, N-methylpyrrolidone, γ-butyrolactone, benzyl alcohol, dibutyl phthalate, butane-1,4-diol, or ethyl methyl ketone.

Curing can be carried out, depending on the nature of the polyamine, at room temperature (say, 18 to 25° C.) or at higher temperature (50° to 180° C., for example).

The new compositions may further contain suitable plasticisers such as dibutyl phthalate and dioctyl phthalate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of tertiary, aliphatic, monocarboxylic acids, glycidyl acrylate, and glycidyl methacrylate. They may also contain additives such as fillers, reinforcing materials, colouring matter, flow control agents, flame inhibitors, and mould lubricants. Suitable extenders, fillers, and reinforcing materials are, for example, glass fibres, carbon fibres, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, paints and lacquers, sinter powders, impregnating and casting resins, moulding compositions, putties and sealing compounds, potting and insulating compounds for the electrical industry, and adhesives, and also in the manufacture of such products.

They may be supplied as a two-part pack, one part containing the epoxide resin and the other the polyamine, the accelerator being in either or both parts, but advantageously only in the part containing the polyamine, because some epoxide resins tend to polymerise slowly, over a period of some months, when kept in contact with the metal nitrate at room temperature.

The following Examples illustrate the invention. Temperatures are in degree Celsius and, unless otherwise specified, parts are by weight. The accelerating effect is shown, as is conventional in this art, by the reduction in the time taken for the composition to gel, prior to curing: gelation times were determined by means of a "Techne" gelation timer, supplied by Techne (Cambridge) Limited, Duxford, Cambridge, England.

"Epoxide resin I" denotes a polyglycidyl ether of 2,2-bis(4-hydroxyphenyl)propane having a 1,2-epoxide content of 5.16 equivalents per kilogram and a viscosity at 21° of 245 poises.

"Epoxide resin II" denotes the diglycidyl ether of butane-1,4-diol.

"Epoxide resin III" denotes N,N'-diglycidyol-5,5-dimethylhydantoin.

"Epoxide resin IV" denotes N-glycidyl-N'-(2-glycidyloxypropyl)-5,5-dimethylhydantoin. "Epoxide resin V" denotes the tetraglycidyl ether of pentaerythritol, advanced with 2,2-bis(4-hydroxyphenyl)propane to an epoxide content of 8.5 equiv./kg.

"Epoxide resin VI" denotes diglycidyl tetrahydrophthalate; its 1,2-epoxide content was 6.0 equiv./kg. "Epoxide resin VII" denotes the tetrakis(N-glycidyl) derivative of bis(4-aminophenyl)methane.

"Epoxide resin VIII" denotes 3,4-epoxycyclohexymethyl 3',4'-epoxycyclohexanecarboxylate.

"Hardener I" denotes a commercially available liquid curing agent, composed essentially of bis(4-aminophenyl)methane.

Where the salts employed were obtained from commercial sources in a hydrated form, they were first dried by azeotropic removal of water with ethylene dichloride.

EXAMPLE 1

Epoxide resin I (50 g) was mixed at room temperature with Hardener I (16 g). The gel time was 2682 minutes. Next, the experiment was repeated, incorporating in each case 0.5 g of a 50% solution of a dried salt in 2-methoxyethanol. Sodium and ammonium nitrates and magnesium fluoborate were employed for comparative purposes. The resultant gel times are listed in Table I.

TABLE I

| Salt | Gel time (minutes) |
| --- | --- |
| Cadmium nitrate | 136 |
| Lanthanum nitrate | 8 |
| Iron III nitrate | 269 |
| Magnesium nitrate | 18 |
| Manganese nitrate | 7½ |
| Nickel nitrate | 164 |
| Zinc nitrate | 26 |
| Sodium nitrate | 2642 |
| Ammonium nitrate | 2163 |
| Magnesium fluoborate | 511 |

Thus it can be seen that, while sodium and ammonium nitrates had little accelerating effect, the other nitrates had a marked effect. Also, that although magnesium nitrate was an efficient accelerator, the corresponding fluoborate was much less effective. These results show that the accelerating effect is dependent upon the whole molecule of the salt, not just upon the cation or anion.

EXAMPLE 2

Example 1 was repeated, employing other types of epoxide resin. The accelerator, when used, was a 50% solution of magnesium nitrate in 2-methoxyethanol. The results are given in Table II.

TABLE II

| Resin Type | g | Hardener Type | g | Acceleration (g) | Gel time (minutes) |
| --- | --- | --- | --- | --- | --- |
| II | 50 | I | 22.8 | — | 8136 |
| II | 50 | I | 22.8 | 0.5 | 35 |
| III / IV | 35 / 15 | I | 21 | — | 4570 |
| III / IV | 35 / 15 | I | 21 | 0.5 | 24 |
| V | 50 | I | 20 | — | 3436 |
| V | 50 | I | 20 | 0.5 | 26 |
| VI | 50 | I | 19.6 | — | 4580 |
| VI | 50 | I | 19.6 | 0.5 | 13½ |
| VII | 50 | I | 38.5 | — | 6159 |
| VII | 50 | I | 38.5 | 0.5 | 392 |
| VIII | 50 | I | 22 | — | >75000 |
| VIII | 50 | I | 22 | 0.5 | 640 |

EXAMPLE 3

In this Example, the efficacy of an accelerator of this invention is compared with those of conventional accelerators.

A mixture (50 g) comprising 87% of Epoxide resin I and 13% of iso-octyl glycidyl ether was mixed at room temperature with Hardener I (16 g). The gel time at room temperature was 2507 minutes.

The experiment was repeated, using two conventional accelerators. When 2-methoxyethyl hydrogen maleate (0.5 g) was incorporated, the corresponding gel time was 379 minutes: when salicylic acid (0.5 g) was incorporated, the gel time at room temperature was 117 minutes.

Finally, the experiment was repeated with 0.5 g of a 50% solution of manganese nitrate in 2-methoxyethanol incorporated. The gel time at room temperature was only 45 minutes.

EXAMPLE 4

The procedure of Example 1 was repeated, incorporating in each case 0.5 g of a 50% solution of a dried nitrate in 2-methoxyethanol, except when lead nitrate was used: because of its low solubility in 2-methoxyethanol, 1 g of a 25% solution was employed. Table III shows the resultant gel times.

TABLE III

| Salt | gel time (minutes) |
| --- | --- |
| Cobalt II nitrate | 11 |
| Lead II nitrate | 98 |
| Chromium III nitrate | 385 |

What is claimed is:

1. Composition comprising
   (a) an aromatic compound having more than one amino group directly attached to an aromatic ring and
   (b) a nitrate of magnesium, lanthanum, manganese, zinc, or cobalt.

2. A composition according to claim 1, in which (b) is dissolved in an inert organic solvent.

3. A composition according to claim 2, in which the solvent is 2-methoxyethanol, ethylene glycol, diethylene glycol, N-methylpyrrolidone, γ-butyrolactone, benzyl alcohol, dibutyl phthalate, butane-1,4-diol, or ethyl methyl ketone.

4. A composition according to claim 1, in which the polyamine (a) is o-, m, or p-phenylenediamine, bis(4-aminophenyl)methane, an aniline-formaldehyde resin, bis(4-aminophenyl) sulfone, bis(4-aminophenyl) ketone, bis(4-aminophenyl) sulfide, or bis(3-aminophenyl) sulfone.

5. A composition according to claim 1, which further contains an epoxide resin.

6. A composition according to claim 5, in which the epoxide resin contains groups of the formula

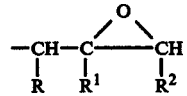

directly attached to atoms of oxygen, nitrogen, or sulfur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

7. A composition according to claim 6, in which the epoxide resin is a polyglycidyl ester, a polyglycidyl ether, or an N,N'-diglycidylhydantoin.

8. A composition according to claim 5, in which the polyamine (a) provides from 0.75 to 1.25 amino-hydrogen equivalents per 1,2-epoxide equivalent of the epoxide resin.

9. A composition according to claim 5, containing from 0.2 to 2 parts by weight of the nitrate (b) per 100 parts of the combined weights of the epoxide resin and the polyamine (a).

10. A two part pack, the components of which, on mixing, form a composition as claimed in claim 5, one part containing the epoxide resin and the other part the polyamine (a), at least one part containing the nitrate (b).

* * * * *